(12) United States Patent
Liao et al.

(10) Patent No.: US 6,654,479 B1
(45) Date of Patent: Nov. 25, 2003

(54) COCKTAIL WATERMARKING ON IMAGES

(75) Inventors: Hong-Yuan Mark Liao, Taipei (TW); Chun-Shien Lu, Tainan Hsieng (TW)

(73) Assignee: Academia Sinica, Taipei (TW)

( * ) Notice: Subject to any disclaimer, the term of this patent is extended or adjusted under 35 U.S.C. 154(b) by 0 days.

(21) Appl. No.: 09/377,236

(22) Filed: Aug. 19, 1999

(51) Int. Cl.$^7$ ................................................. G06K 9/00

(52) U.S. Cl. ...................................... 382/100; 713/176

(58) Field of Search ........................... 380/54, 51, 210, 380/252, 287, 201; 382/100, 232, 284; 713/176, 179; 370/522, 523, 524, 527, 529; 283/72, 74, 75, 76, 81, 85, 93

(56) References Cited

U.S. PATENT DOCUMENTS

| | | | |
|---|---|---|---|
| 5,809,160 A | * 9/1998 | Powell et al. | 382/100 |
| 5,905,819 A | * 5/1999 | Daly | 382/284 |
| 6,041,143 A | * 3/2000 | Chui et al. | 382/232 |
| 6,154,571 A | * 11/2000 | Cox et al. | 382/250 |

FOREIGN PATENT DOCUMENTS

WO    WO 99/36876    7/1999

OTHER PUBLICATIONS

Antonini et al., "Image Coding Using Wavelet Transform", IEEE Transactions on Image Processing, vol. 1, Apr. 1992, pp. 205–220.

Barni et al., "Copyright protection of digital images by embedded . . . ", Image and Vision Computing, vol. 16, 1996, pp. 897–906.

Cox et al., "Secure Spread Spectrum Watermarking for Media", IEEE Transactions of Image Processing, vol. 6, Dec. 1997, pp. 1673–1686.

Craver et al., "Resolving Rightful Ownerships with Invisible Watermarking . . . ", IEEE Journal of Selected Areas in Communication, vol. 16, May 1998, pp. 573–586.

Delaigle et al., "Watermarking algorithm based on a human visual model", Signal Processing, vol. 66, 1998, pp. 319–335.

J. Fridrich, "Combining low–frequency and spread spectrum watermarking", Center for Intelligent System, SUNY Binghamton, NY and Mission Research Corporation, Albuquerque, NM.

Hartung et al., "Spread Spectrum Watermarking: Malicious Attacks and Counterattacks", Telecommunications Laboratory, University of Erlangen–Nuremberg, Germany, 1999.

Hartung et al., "Watermarking of uncompressed and compressed video", Signal Processing, vol. 66, 1998, pp. 283–301.

Kundur et al., "Digital Watermarking Using Multiresolution Wavelet Decomposition", Dept. of Electrical and Computer Engineering, University of Toronto, Canada.

Lu et al., "A New Watermarking Technique for Multimedia Protection", Institute of Information Science, Academia Sinica, Taipei, Taiwan.

Petitcolas et al., "Attacks on copyright marking systems", Second Workshop on Information Hiding, Oregon, USA, Apr. 15–17, 1998, pp. 1–21.

(List continued on next page.)

Primary Examiner—Bhavesh M. Mehta
Assistant Examiner—Abolfazl Tabatabai
(74) Attorney, Agent, or Firm—Fish & Richardson P.C.

(57) ABSTRACT

A novel image protection scheme named "cocktail watermarking" improves over current spread-spectrum watermarking approaches. Two watermarks, which play complementary roles, are simultaneously embedded into an original image. The new watermarking scheme has the characteristic that, no matter what an attack is, at least one watermark typically survives well and can be detected. Results of extensive experiments indicate that our cocktail watermarking scheme is effective in resisting various attacks.

12 Claims, 4 Drawing Sheets

OTHER PUBLICATIONS

Podichuk et al., "Image–Adaptive Watermarking Using Visual Models", IEEE Journal on Selected Areas in Communications, vol. 16, May 1998, pp. 525–539.

Said et al., "A New, Fast, and Efficient Image Codec Based on Set Partitioning . . . ", IEEE Transactions on Circuits and Systems for Video Technology, vol. 6, Jun. 1996, pp. 243–249.

Swanson et al., "Multiresolution Scene–Based Video Watermarking Using Perceptual Models", IEEE Journal on Selected Areas in Communication, vol. 16, May 1998, pp. 540–550.

Watson et al., "Visibility of Wavelet Quantization Noise", IEEE Transactions on Image Processing, vol. 6, Aug. 1997, pp. 1164–1174.

Chun–Shien Lu et al., "Cocktail Watermarking on Images". Lecture Notes in Computer Science, Springer–Verlag. XP–002230493.

* cited by examiner

COCKTAIL WATERMARKING ON IMAGES

BACKGROUND

This invention relates to embedding information in an image.

Conventionally, hand-written signatures, seals, or other markings are used by artists and authors to identify documents or images as their work, for example to claim a copyright or other ownership right on their work. However, digital technology for manipulating images has made it difficult to mark images in a way that the marking cannot be removed or obliterated. Additionally, owing to the popularity of Internet, the use and transfer of digitized media including media bearing digitized images has increased. Therefore, it is imperative to protect works from intentional or unwitting use which is contrary to an owner's rights. A commonly used method for identifying a work is to insert a watermark into the original work. Watermarks which are embedded in an original work are expected to tolerate attacks of any kind. Detection of a valid watermark in a work enables an owner of the work to identify the work as their own. It is desirable to be able to detect such a watermark, even if the work is modified, for example by processing an image.

SUMMARY

The invention is directed to a novel image protection scheme named "cocktail watermarking". To improve over current spread-spectrum watermarking approaches, two watermarks, which play complementary roles, are simultaneously embedded into an original image. The new watermarking scheme has the characteristic that, no matter what an attack is, at least one watermark typically survives well and can be detected. Results of extensive experiments indicate that our cocktail watermarking scheme is effective in resisting various attacks.

In one aspect, in general, the invention is a method for adding information to a first image including the following steps. The method includes transforming the first image to form a set of transform coefficients which represent the image. A first subset of the transform coefficients is selected and each of this first subset is modified such that the magnitude of each of the coefficients more likely to be increased than decreased. A second subset of the transform coefficients is selected and modified such that the magnitude of each of the coefficients is more likely to be decreased than increased. The method then includes forming a second image using the modified first and second subsets of transform coefficients.

The invention can include one or more of the following features:

Transforming the first image is done by computing a wavelet transform of the image, and the second image is formed by taking an inverse wavelet transform of modified wavelet transform coefficients.

The magnitude of each of the coefficients in the first and the second subsets is greater than a just noticeable difference value for that coefficient.

Modifying each of the first subset of transform coefficients includes increasing the magnitude of each of said first set of coefficients, and modifying each of the second subset of transform coefficients includes decreasing the magnitude of each of said second set of coefficients.

The method further includes computing a set of random numbers. Increasing the magnitude of each of the first subset of coefficients then includes increasing the magnitude of each of the coefficients according to a different one of the random numbers, and decreasing the magnitude of each of the second subset of coefficients includes decreasing the magnitude of each of the coefficients according to a different one of the random numbers.

The method can further include accepting a third image, which may be a processed version of the second image. The method then includes transforming the third image to form a set of transform coefficients which represent said third image and computing a difference between the transform coefficients of the first image and the transform coefficients of the third image. An indicator that the third image is a processed version of the second image is then determined from the computed difference.

In another general aspect of the invention, a method for detecting information embedded in an image includes the following. The method includes accepting an image and transforming the accepted image to form a set of transform coefficient which represent the accepted image. The method also includes accepting an original image and transforming the original image to form a set of transform coefficients which represent the original image. A difference between the transform coefficients of the original image and the transform coefficients of the accepted image are computed. Multiple estimates of a watermark sequence are determined such that each estimate is determined from a different subset of the computed differences between transform coefficients. Multiple indicators that the watermark sequence was encoded in the accepted image are computed, each indicator being associated with a different one of the determined estimates of the watermark sequence. The method then includes determining an overall indicator that the watermark sequence was encoded in the accepted image from the plurality of indicators.

Other features and advantages of the invention are apparent from the following description, and from the claims.

DESCRIPTION

Figure 1:
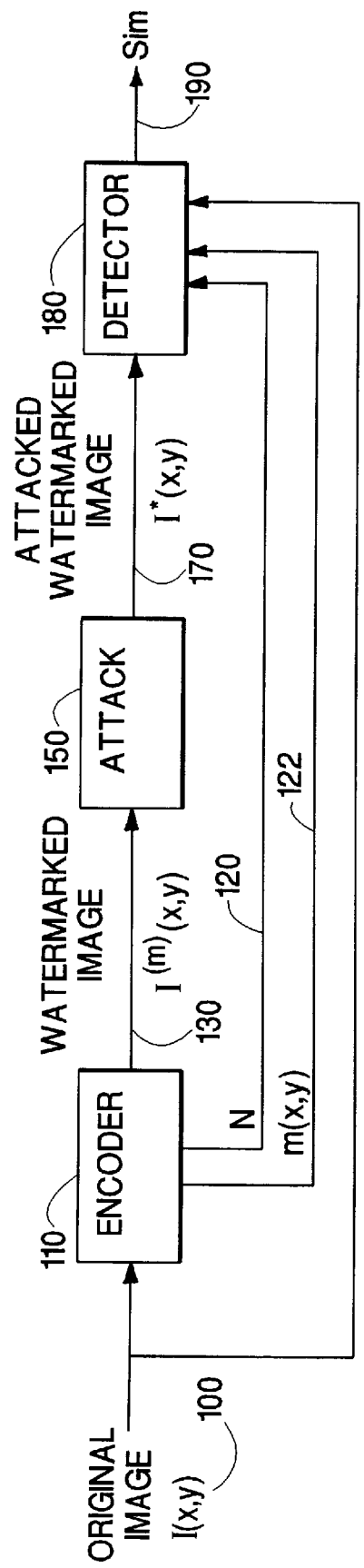
FIG. 1 is a block diagram showing encoding of a watermark and subsequent detection of the watermark.

Referring to FIG. 1, an original image I(x,y) 100 is processed by an encoder 110 in order to mark the image with a so-called "watermark" to produce a watermarked image $I^{(m)}$ (x,y) 130. This watermarked image is distributed, for example, over electronic distribution media or channels such as on magnetic disks or over the Internet. During distribution, watermarked image $I^{(m)}$ (x,y) 130 may be modified either inadvertently or intentionally such that the resulting image is not identical to watermarked image $I^{(m)}$ (x,y). Such a modification is often referred to as an "attack" alluding to an intentional modification aimed at removing a watermark. Here we refer to an attack as any modification, intentional or not. In FIG. 1, this modification is represented by attack 150, which takes watermarked image $I^{(m)}$ (x,y) 130 and produces attacked watermarked image I* (x,y) 170. A detector 180 processes attacked watermarked image I* (x,y) 170, along with additional information produced during the encoding phase (described further below), to produce a scalar quantity, Sim 190, which indicates whether the input to detector 180 is indeed a modified version of watermarked image $I^{(m)}$ (x,y) 130. That is, detector 180 determines whether its input is attacked watermarked image I* (x,y) 120 as shown in FIG. 1 as opposed to a version of original image I(x,y) 100 or that was not watermarked by encoder 100, or marked with a different watermark. Detector 180 makes use of original image I(x,y) 100 as well as other information produced by encoder 110, such as a random watermark sequence N 120 and a mapping m(x,y) 122 which identifies where in watermarked image $I^{(m)}$ (x,y) 130 watermark sequence N 120 is "hidden." This other information is not distributed along with the watermarked image, thereby making it difficult to remove the watermark from the distributed image.

A desirable property of the combination of encoder 110 and detector 180 is that the determination of whether the input to detector 180 is an attacked watermarked image should be robust to a variety of types of attacks 150. Typical types of attacks 150 include median filtering, resealing, sharpening, histogram equalization, dithering, compression, photocopying, and blurring. A property of many types of attacks is that the coefficients of a wavelet transform of an attacked image are either mostly increased in magnitude (that is, significantly more than one half of the coefficients are increased in magnitude), or are mostly decreased in magnitude, compared to the corresponding coefficients of the image prior to the attack. Although not limited to attacks with such characteristics, the approach embodied in this invention is particularly well matched to attacks with this property.

Figure 2A:
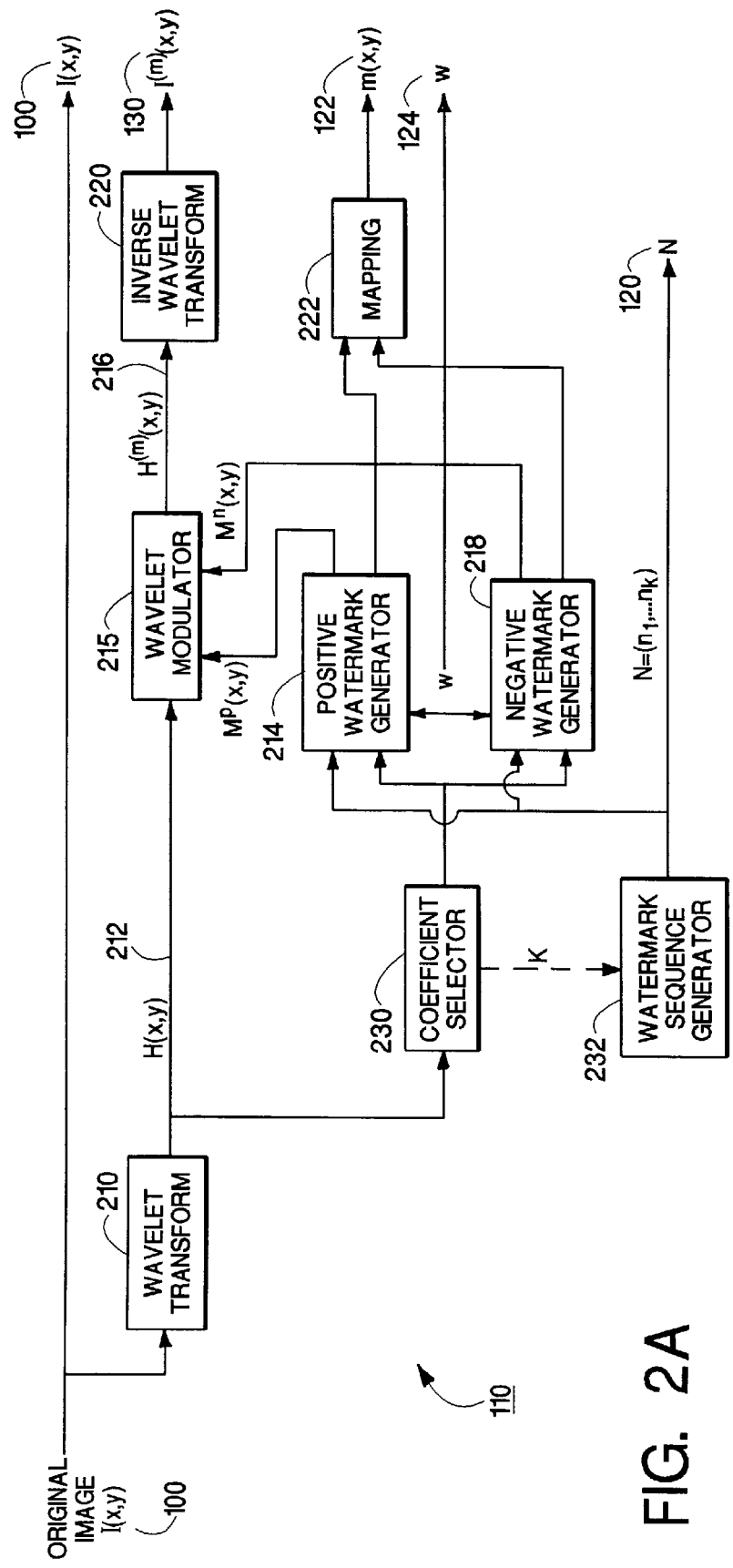
FIG. 2A is a block diagram of an encoder, which encodes a watermark sequence into an original image.

Referring to FIG. 2A, encoder 110 includes a number of logical modules. An overall approach used in encoder 110 is to hide two complementary watermarks in original image I(x,y) 100 to produce watermarked image $I^{(m)}$ (x,y) 130. The complementary watermarks are chosen such that under typical attacks, at least one of the watermarks survives and is easily detectable by detector 180 (FIG. 1). We refer to this general approach of applying two, or more, watermarks to an image as "cocktail" watermarking.

Encoder 110 accepts original image I(x,y) 100. In the discussion that follows, original image 100 is made up of 128 by 128 grayscale pixels. In alternative embodiments, other sizes of images, and black-and-white or color images are processed using the same approach. Encoder 110 applies two watermarks in the original image I(x,y) 100 in the transform domain by modifying a selected subset of transform coefficients of the image to encode a watermark sequence. In this embodiment, encoder 110 uses a wavelet transform 210 to compute a wavelet representation made up of wavelet coefficients H(x,y) 212. In other embodiments, other transforms are used, for example, a discrete cosine transform. After computing the wavelet representation, encoder 110 modifies a subset of wavelet coefficients H(x,y) 212 at a wavelet modulator 215 to produce a modified representation made up of modulated wavelet coefficients $H^{(m)}$ (x,y) 216. The encoder applies an inverse wavelet transform 220 to the modulated wavelet coefficients 216 to produce watermarked image $I^{(m)}$ (x,y) 130.

Figure 2B:
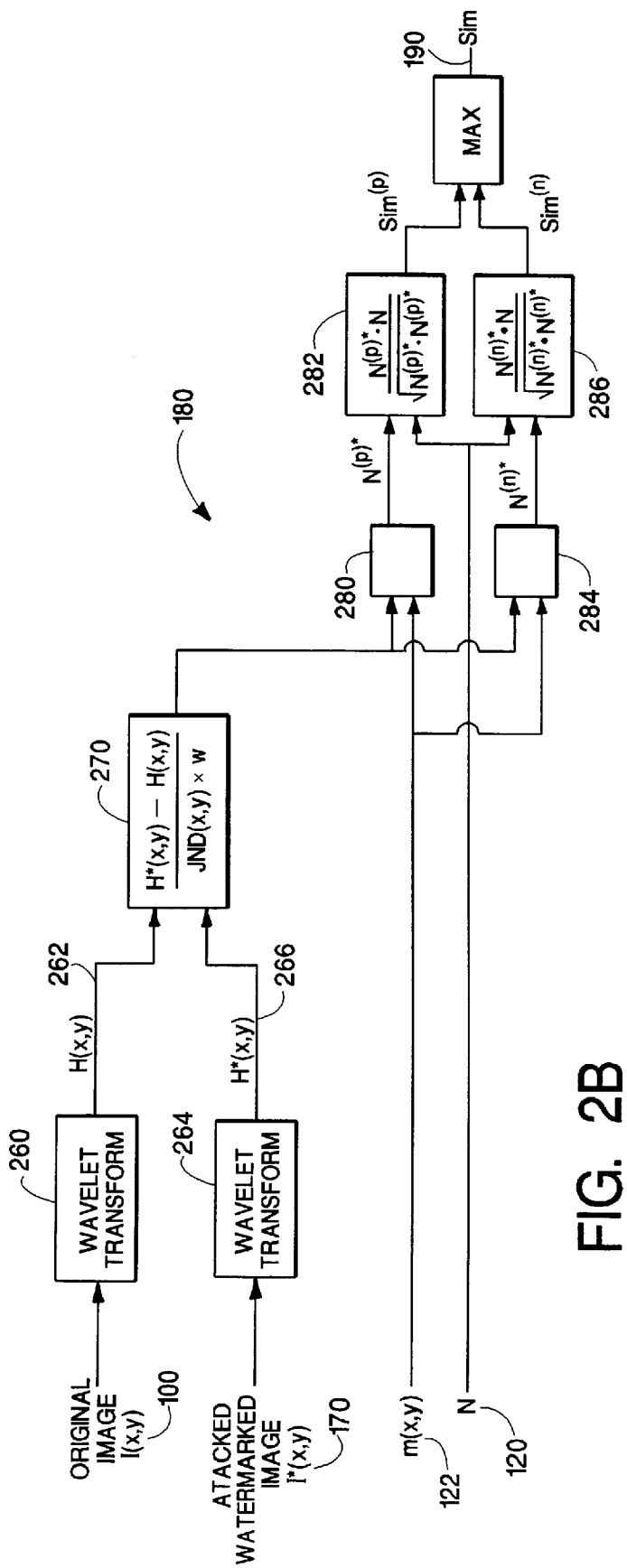
FIG. 2B is a block diagram of a detector, which detects a watermark sequence encoded in an image.

Turning now to FIG. 2B, detector 180 inputs attacked watermarked image I* (x,y) 170 which is either watermarked image $I^{(m)}$ (x,y) 130 or an attacked version of that watermarked image. Detector 180 produces a scalar quantity Sim 190, indicates whether the image was indeed processed (watermarked) by encoder 110. In order to compute Sim 190, the detector makes use of original image I(x,y) 100, attacked watermarked image I* (x,y) 170, as well as several other quantities computed by encoder 110, which are described below, that were computed during the encoding process.

Referring back to FIG. 2A, encoder 110 encodes watermark sequence N 120 into original image I(x,y) 100. Encoder 110 applies the watermark sequence as two separate watermarks: as a positive watermark $M^{(p)}$ (x,y) produced by a positive watermark generator 214, and as a negative watermark $M^{(n)}$ (x,y) produced by a negative watermark generator 218. The outputs of watermark generators 214 and 218 are passed to wavelet modulator 215 which modifies wavelet coefficients H(x,y) 212 of the original image.

Watermark sequence N 120 is passed to the detector for use in determining whether the attacked watermarked image indeed encodes that watermark sequence. In addition, mapping m(x,y) 122 is passed from the encoder to the decoder. This mapping identifies which wavelet coefficients were modified during the encoding stage. In addition, a scale factor w 124 is passed from the encoder to the decoder. Scale factor w 124 is related to the degree to which watermark sequence N 120 is encoded into the original image.

Figure 3:
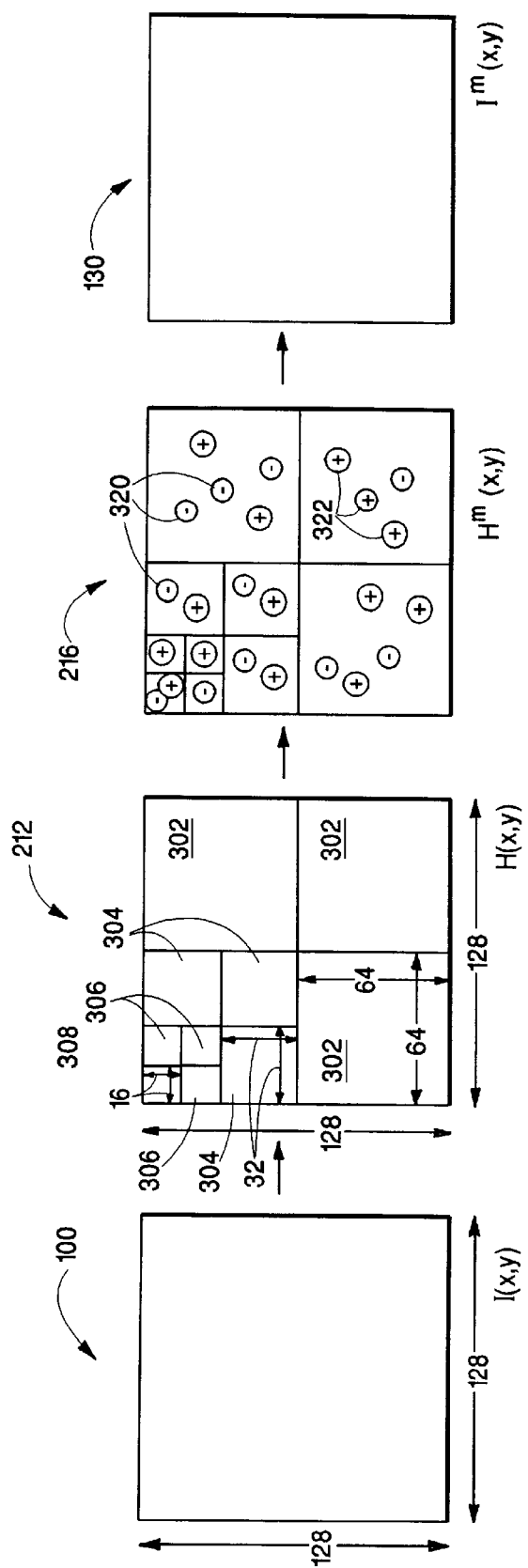
FIG. 3 is an illustration of steps of an encoding process.

Turning to FIG. 3, the process carried out by encoder 110 is illustrated as a sequence of three transformations. First, original image I(x,y) 100 is transformed using wavelet transform 210 (FIG. 2A) to produce wavelet coefficients H(x,y) 212. The wavelet transform produces the same number of coefficients as in the original image, in this case 128 by 128. Using conventional wavelet transform techniques, the wavelet coefficients are arranged in terms of nested sets of coefficients each associated with different spatial scales: three sets of 64 by 64 coefficients 302 represent three orientations of a first spatial scale; three sets of 32 by 32 coefficients 304 represent the next scale; three sets of 16 by 16 coefficients 306 represent the next; and a final set of 16 by 16 coefficients 308 represent a remaining image at the final spatial scale. Although illustrated with the scale and orientation structure, wavelet coefficients H(x,y) are indexed by a "position" (x,y) where the x and y indices each range over 128 values spanning all the scales and orientations of the wavelet transform coefficients.

Referring still to FIG. 3, in the next transformation, wavelet coefficients H(x,y) 212 are modulated by the encoder to produce $H^{(m)}$ (x,y) 216. In general, most of the coefficient values are unchanged in this transformation, thereby avoiding a significant degradation of the original image. A sequence of coefficients 322 (the positions of which are illustrated with the plus signs) are modulated according to the positive watermark, and a sequence of coefficients 320 (the positions of which are illustrated with the minus signs) are modulated according to the negative watermark. The selection of these sequences and the details of modulating the coefficients are described below. The positions of these modulated coefficients are encoded in mapping m(x,y) 122 which is passed from encoder 110 to detector 180.

In the final transformation carried out by encoder 110, modulated wavelet coefficients 216 are passed to inverse wavelet transform 220 to produce watermarked image $I^{(m)}$ (x,y) 130.

Turning back to FIG. 2A, wavelet coefficients H(x,y) 212 are passed to a coefficient selector 230 which determines the sequence of positions of coefficients to modulate 320 and 322 (see FIG. 3). In order to reduce the perceptual effects of the encoding procedure, coefficient selector 230 chooses a subset of the wavelet coefficients such that each of the selected coefficients is greater in magnitude than the just noticeable difference (JND) for that coefficient. The just noticeable difference for a coefficient is the least amount by which the coefficient may be changed for the change to be perceptible in the corresponding image. In this embodiment which makes use of the wavelet transform, the JND for each coefficient is computed independently of the original image, and depends on the spatial scales of the wavelet coefficients.

Of coefficients with sufficiently large magnitude, half are used for the positive watermark and half are used for the negative watermark. Coefficient selector 230 passes a length, k, which is one half the number of selected coefficients to a watermark sequence generator 232.

Watermark generator 232 generates a random sequence watermark sequence $N=(n_1, \ldots, n_k)$ 120, each element of which is independently chosen from a Gaussian distribution with mean zero and variance 1 (i.e., $n_i \sim N(0,1)$). Encoder 110 passes watermark sequence 120 to both positive watermark generator 214 and negative watermark generator 218 as well as subsequently to detector 180.

Returning to coefficient selector 230, after having selected the coefficients with sufficiently large magnitude, coefficient selector 230 determines a randomized sequence of those selected coefficients. Coefficient selector sends the positions and values of the sequence of coefficients to positive and negative watermark generators 214 and 218, respectively. Each of the watermark generators uses alternating elements in the sequence. That is, the positive and negative watermarks are interleaved.

Positive watermark generator 214 generates positive watermark $M^{(p)}$ (x,y) such that the magnitude of the corresponding selected wavelet coefficients is, in general, increased. On the other hand, negative watermark generator 218 generates negative watermark $M^{(n)}$ (x,y) such that the magnitude of the corresponding selected wavelet coefficients is, in general, decreased.

Positive watermark generator 214 generates positive watermark $M^{(p)}$ (x,y) as follows. First, it sorts watermark sequence N 120. Values from the watermark sequence are used in turn; $n_{bottom}$ refers to the largest (most positive) value in the sequence that has not yet been used, and $n_{top}$ refers to the smallest (most negative) values that has not yet been used. For every other of the coefficient sequence, $(x_p,y_p)$ generated by coefficient selector 230 (that is positions 322 in FIG. 3) positive watermark generator 214 computes $$M^{(p)}(x_p, y_p) = JND(x_p, y_p) \times w \times n_{bottom} \quad \text{if } H(x_p, y_p) > 0$$
$$= JND(x_p, y_p) \times w \times n_{top} \quad \text{if } H(x_p, y_p) < 0$$

In this way $M^{(p)}$ $(x_p,y_p)$ will typically (but not necessarily due to the random nature of N 120) have the same sign as $H(x_p,y_p)$ and therefore when added to $H(x_p,y_p)$ will increase its magnitude.

Negative watermark generator 218 generates negative watermark $M^{(n)}$ (x,y) in a complementary manner. For every other of the coefficient sequence generated by coefficient selector 230, that is, the coefficients not used by the positive watermark generator, $(x_n,y_n)$, negative watermark generator 218 computes $$M^{(n)}(x_n, y_n) = JND(x_n, y_n) \times w \times n_{top} \quad \text{if } H(x_n, y_n) > 0$$
$$= JND(x_n, y_n) \times w \times n_{bottom} \quad \text{if } H(x_n, y_n) < 0$$

so that $M^{(n)}$ $(x_n,y_n)$ will typically (but not necessarily due to the random nature of N) have the opposite sign as $H(x_n,y_n)$.

Positive watermark generator 214 and negative watermark generator 218 pass the indices of the selected elements of watermark sequence 120 to a mapping module 222 which generates mapping m(x,y) 122 such that $m(x_p,y_p)=i$ at the position that uses $n_i$ in the positive watermark and $m(x_n,y_n)=-i$ at the position that uses $n_i$ in the negative watermark.

Referring still to FIG. 2A, wavelet modulator 215 accepts positive and negative watermarks $M^{(p)}$ $(x_p,y_p)$ and $M^{(n)}$ $(x^n,y^n)$ and their positions. For each position to be modified by the positive watermark, wavelet modulator 215 computes $$H^{(m)}(x_p,y_p) = H(x_p,y_p) + M^{(p)}(x_p,y_p)$$

and for each position to be modified by the negative watermark, it computes $$H^{(m)}(x_n,y_n) = H(x_n,y_n) + M^{(n)}(x_n,y_n)$$

and leave the remaining coefficients unchanged $$H^{(m)}(x,y) = H(x,y).$$

Referring now to FIG. 2B, detector 180 accepts attacked watermarked image I* (x,y) 170. Detector 180 also receives original image I(x,y) 100, mapping m(x,y) 122 and watermark sequence N 120. Detector 180 applies wavelet transform 260 to original image I(x,y) 100 to compute wavelet coefficients H(x,y) 262 and applies wavelet transform 264 to attacked watermarked image I*(x,y) 170 to compute wavelet coefficients H*(x,y) 266. Wavelet transforms 260 and 264 perform the same function as wavelet transform 210 (FIG. 2A) in encoder 110. Detector 180 then computes a difference between these sets of wavelet coefficients at module 270 by computing $$DIFF(x,y) = (H^*(x,y) - H(x,y))/(JND(x,y) \times w)$$

for each positing in the transforms.

Detector 180 passes the computed difference to a positive watermark estimator 280 and a negative watermark estimator 284. Positive watermark estimator 280 accepts mapping m(x,y) 122 to select the positions at which the watermark sequence was encoded as a positive watermark and determine $N^{(p)*}$, an estimate of watermark sequence 120 as encoded in the positive watermark. Specifically, $n^{(p)*}i = DIFF(x_p,y_p)$ for the position $(x_p,y_p)$ that satisfies $m(x_p,y_p)=i$. Similarly, negative watermark 284 estimator computes $N^{(n)*}$ such that $n^{(n)*}i = DIFF(x_n,y_n)$ for the position that satisfies $m(x_n,y_n)=-i$.

Detector 180 computes a similarity between each of $N^{(p)*}$ and $N^{(n)*}$ and watermark sequence 120 to produce scalar similarities $Sim^{(p)}$ and $Sim^{(n)}$, respectively. In particular, detector 180 computes $$Sim^{(p)} = N \cdot N^{(p)*}/\sqrt{(N^{(p)*} \cdot N^{(p)*})}$$

and $$Sim^{(n)} = N \cdot N^{(n)*}/\sqrt{(N^{(n)*} \cdot N^{(n)*})},$$

where · signifies an inner product between the corresponding sequences. Then detector 180 takes the maximum of $Sim^{(p)}$ and $Sim^{(n)}$ to determine Sim 190. The larger the value of Sim 190, the more certain that its input is indeed a modified version of watermarked image $I^{(m)}$ (x,y) 130.

In an alternative embodiment, detector 180 performs a relocation step prior to computing the difference between the wavelet coefficients of the original image and the attacked watermarked image. The relocation step involves the detector using $H^{(m)}$ (x,y), the wavelet coefficients of the watermarked image (prior to attack), which it either receives from the encoder or alternatively that it recomputes from the original image it receives from the encoder. The coefficients of $H^{(m)}$ (x,y) and H* (x,y) are each sorted by magnitude and the coefficients of H* (x,y) are relocated such that the $k^{th}$ largest coefficient of H* (x,y) is moved to the position of the $k^{th}$ largest coefficient of $H^{(m)}$ (x,y) for all positions in the transformed images.

In experiment using the above approaches, a tiger image of size 128×128 was used for hiding watermarks. The length k of a hidden watermark sequence N depends on the original image and the wavelet-based visual model which determined the JND values for the wavelet coefficients. Using the tiger image, a total 2714 wavelet coefficients of the possible 16,348=$128^2$ were selected by coefficient selector 230 (FIG. 2A). The PSNR of the watermarked image was 34.5 dB. 32 different attacks 150 (FIG. 1) were to test the watermarking approach. The results show that typically, one of $Sim^{(p)}$ or $Sim^{(n)}$ is significantly greater than the other, indicating that one watermark may be destroyed while the other one survives well. Some attacks severely damaged the watermarked image, but the embedded watermarks can still be extracted with high detector response. Also, the detector response was generally increased using the relocation step described above as compared to not performing relocation.

It is to be understood that while the invention has been described in conjunction with the detailed description thereof, the foregoing description is intended only to illustrate particular embodiments of the invention and not to limit the scope of the invention, which is defined by the scope of the appended claims. Other aspects, advantages, and modifications are within the scope of the following claims.

What is claimed is:

1. A method for adding information to a first image comprising:
   transforming the first image to form a plurality of transform coefficients which represent said first image;
   selecting a first subset of the transform coefficients;
   modifying each of the first subset of transform coefficients such that the magnitude of each of the coefficients is more likely to be increased than decreased;
   selecting a second subset of the transform coefficients;
   modifying each of the second subset of transform coefficients such that the magnitude of each of the coefficients is more likely to be decreased than increased; and
   forming a second image using the modified first subset of transform coefficients and the second subset of transform coefficients.

2. The method of claim 1 wherein transforming the first image includes computing a plurality of wavelet coefficients from the first image.

3. The method of claim 2 wherein the magnitude of each of the coefficients in the first and the second subsets is greater than a multiple of a just noticeable difference value for that coefficient.

4. The method of claim 3 wherein modifying each of the first subset of transform coefficients includes increasing the magnitude of each of said first set of coefficients, and modifying each of the second subset of transform coefficients includes decreasing the magnitude of each of said second set of coefficients.

5. The method of claim 4 further comprising computing a plurality of random numbers, and wherein increasing the magnitude of each of the first subset of coefficients includes increasing the magnitude of each of said first set of coefficients according to a different one of the random numbers, and wherein decreasing the magnitude of each of the second subset of coefficients includes decreasing the magnitude of each of said second set of coefficients according to a different one of the random numbers.

6. The method of claim 1 further comprising:
   accepting a third image;
   transforming the third image to form a plurality of transform coefficients which represent said third image;
   computing a difference between the transform coefficients of the first image and the transform coefficients of the third image;
   determining an indicator that the third image is a processed version of the second image from the computed difference.

7. A method for adding watermarking information to an image comprising:
   transforming the first image to form a plurality of transform coefficients which represent said first image;
   selecting a first subset of the transform coefficients associated with a first watermarking sequence;
   modifying each of the first subset of transform coefficients such that the magnitude of each of the coefficients is more likely to be increased than decreased;
   selecting a second subset of the transform coefficients associated with a second watermarking sequence
   modifying each of the second subset of transform coefficients such that the magnitude of each of the coefficients is more likely to be decreased than increased; and
   forming a watermarked image using the modified first subset of transform coefficients and the second subset of transform coefficients.

8. The method of claim 7 wherein transforming the first image includes computing a plurality of wavelet coefficients from the first image.

9. The method of claim 8 wherein the magnitude of each of the coefficients in the first and the second subsets is greater than a multiple of a just noticeable difference value for that coefficient.

10. The method of claim 9 wherein modifying each of the first subset of transform coefficients includes increasing the magnitude of each of said first set of coefficients, and modifying each of the second subset of transform coefficients includes decreasing the magnitude of each of said second set of coefficients.

11. The method of claim 10 further comprising computing a plurality of random numbers, and wherein increasing the magnitude of each of the first subset of coefficients includes increasing the magnitude of each of said first set of coefficients according to a different one of the random numbers, and wherein decreasing the magnitude of each of the second subset of coefficients includes decreasing the magnitude of each of said second set of coefficients according to a different one of the random numbers.

12. The method of claim 8 further comprising:
    accepting a second image;
    transforming the second image to form a plurality of transform coefficients which represent said second image;
    computing a difference between the transform coefficients of the image and the transform coefficients of the second image;
    determining an indicator that the second image is a processed version of the watermarked image from the computed difference.

* * * * *